Oct. 5, 1943.    B. H. SMITH ET AL    2,331,241
MEASURING INSTRUMENT
Filed May 10, 1941
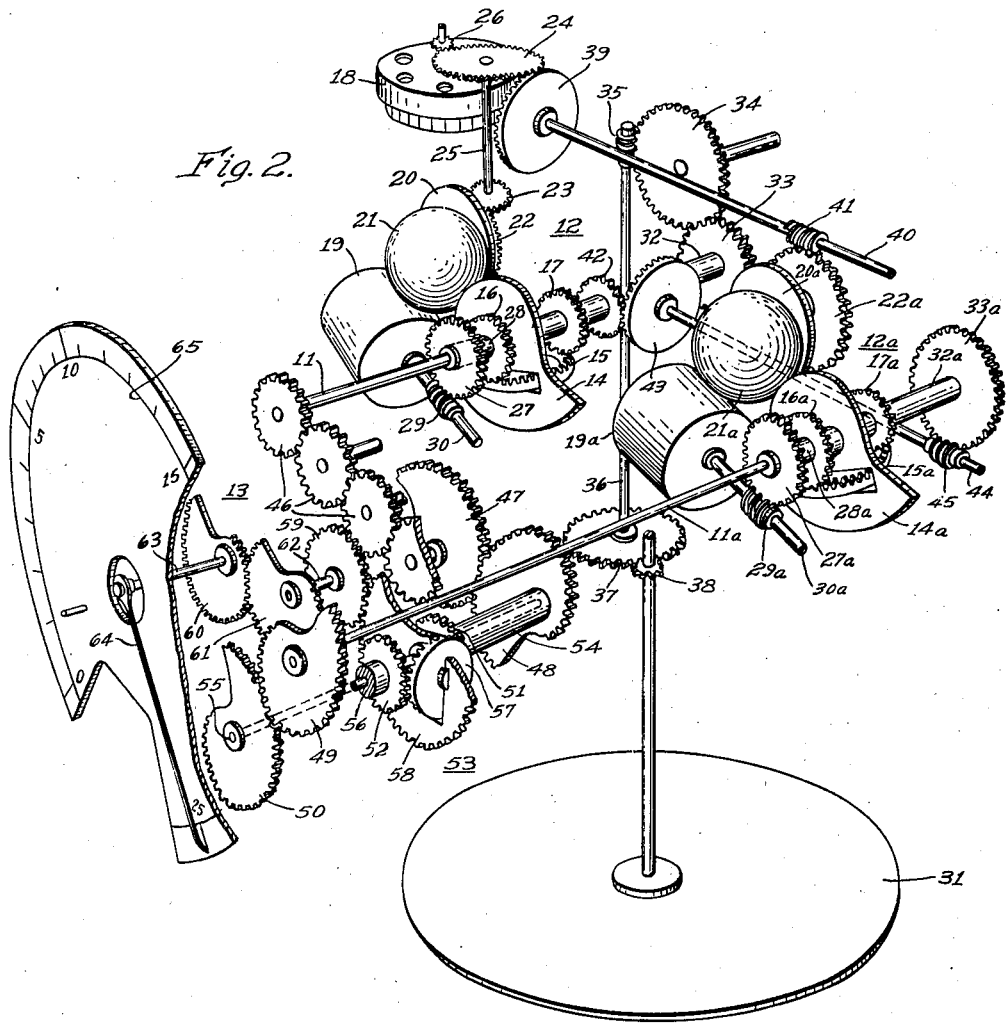
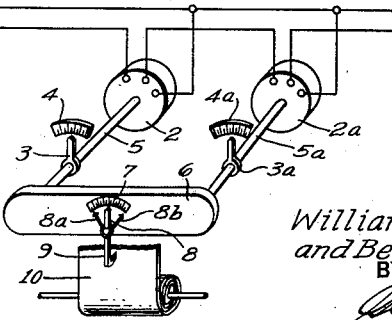
WITNESSES:
INVENTORS
William M. Bradshaw
and Benjamin H. Smith.
BY
ATTORNEY Patented Oct. 5, 1943

2,331,241

UNITED STATES PATENT OFFICE 2,331,241

MEASURING INSTRUMENT

Benjamin H. Smith, Bloomfield, and William M. Bradshaw, Summit, N. J., assignors to Westinghouse Electric & Manufacturing Company, East Pittsburgh, Pa., a corporation of Pennsylvania Application May 10, 1941, Serial No. 392,870

12 Claims. (Cl. 171—34)

This invention relates to measuring instruments and it has particular relation to measuring instruments for measuring the load factor of electrical circuits.

Numerous measuring instruments are available for measuring purposes. For example, instantaneous indicating instruments, integrating instruments and recording instruments are extensively employed for measuring variable quantities. Although such instruments are extremely useful, in certain cases they fail to provide a complete picture of the desired conditions or demand. This may be illustrated by reference to the practice of measuring energy consumption in an electrical circuit.

Load requirements and charges for electrical energy are most commonly based on watthour meter measurements. Such measurements provide a record of the total energy consumption in an electrical circuit between meter readings. The information conveyed by the watthour meter, however, in some cases fails to depict fully the load requirements for an electrical circuit. For example, assume that two consumers of electrical energy use the same amount of electrical energy over a billing period. If one consumer has extremely high peaks during which electrical energy is consumed at a high rate for short periods, the generating capacity and distribution system must be sufficiently large to supply the large amount of energy during the short peak periods of use. In such cases it is inequitable to charge such a consumer at the same rate offered to the consumer who uses the same total amount of electrical energy at a uniform rate. The generating capacity and distribution system for the latter consumer may be considerably smaller.

To care for this situation, it is the practice to employ maximum demand meters for determining the maximum energy demand of a consumer over a short demand interval such as fifteen or thirty minutes. The additional information provided by the maximum demand readings assists in determining the required generating and distribution capacities, and in applying a more equitable rate structure to the various consumers of electrical energy.

However, the information provided still is deficient. This may be illustrated by considering the cases of two consumers of electrical energy who consume the same total amount of electrical energy over a billing period, and who have the same maximum demand peaks. If one of the consumers consumes his electrical energy requirements within a short daily period such as six hours, whereas the other consumer spreads his electrical energy requirement over a longer period such as twenty-four hours, the generating and distribution capacities may be differently affected by the two consumers. Therefore, more complete information concerning electrical energy requirements is desirable.

In accordance with the invention, a measuring device is provided for measuring a relationship between the requirement for a variable quantity, such as electrical energy, over a short interval, and the requirement over a longer interval. As a more specific example, the measuring device may measure the ratio of electrical energy required over a short interval of fifteen or thirty minutes to the energy requirement for a long interval of one day. Such a ratio may be referred to as a "load factor."

It is therefore an object of the invention to provide a measuring device for measuring the requirement of a variable quantity over different intervals.

It is a further object of the invention to provide a measuring device for measuring a relationship between the demands for a variable quantity over different intervals of time.

It is a still further object of the invention to provide a measuring device for measuring the ratio of energy demand for a short interval to energy demand for a long interval.

It is another object of the invention to provide a measuring device for measuring the load factor of an electrical circuit.

Other objects of the invention will be apparent from the following description taken in conjunction with the accompanying drawing in which:

Figure 1 is a schematic view in perspective of a measuring device embodying the invention, and Fig. 2 is a view in perspective with parts broken away of a measuring device suitable for the system of Fig. 1.

Referring to the drawing, Fig. 1 shows an electrical circuit I for supplying electrical energy to a load. This circuit may vary appreciably in construction, but for the purpose of discussion, it will be assumed that the circuit I is a single-phase alternating current circuit, and that it is desired to measure a variable quantity in the circuit such as electrical energy. For this purpose, two measuring units 2 and 2a are connected to the circuit I for energization therefrom. These measuring units may be provided with pointers 3 and 3a for indicating on suitable scales 4 and 4a the quantities measured by the associated measuring units.

Let it be assumed first that the measuring unit 2 is of the instantaneous indicating type such as a wattmeter, whereas the measuring unit 2a is of the integrating type such as a watt-hour meter. If the reading of the watt-hour meter is taken at the beginning and end of a day, the total energy consumed for the day may be ascertained. If the reading of the wattmeter is taken at the end of the day, the instantaneous energy flow or power is found. The ratio of the wattmeter reading to the total electrical energy consumed during the day may be termed the instantaneous load factor for the end of the day.

The instantaneous wattmeter reading generally is not the most desirable reading of energy flow in an electrical distribution circuit. This is for the reason that such a circuit and the associated generator capacity have so much thermal and mechanical inertia that excessive instantaneous power values have no appreciable harmful effects thereon. For this reason it is preferable that the readings of electrical energy consumption be taken over a short interval such as fifteen or thirty minutes. A sustained high electrical energy consumption for such an interval may result in substantial heating of the distribution circuit and its associated generator capacity.

For these reasons let it be assumed that the measuring unit 2 is a maximum demand measuring unit such as the block interval maximum demand unit disclosed in the Lewis et al. Patent 2,047,376 which is assigned to the Westinghouse Electric & Manufacturing Company. With such a measuring unit, the pointer 3 indicates the maximum demand for a predetermined interval such as fifteen or thirty minutes. If, at the end of the day, the reading of the pointer 3 is divided by the total energy consumption for the day as measured by the measuring unit 2a, the resulting ratio may be regarded as the load factor for the day.

A more continuous record of load factor may be obtained by recourse to mechanism of the time lagged type. Let it be assumed that the measuring units 2 and 2a are instruments of the time lagged type disclosed, for example, in the Smith Patents 1,417,695 or 2,003,016, both of which are assigned to the Westinghouse Electric & Manufacturing Company. These patents show, respectively, time lagged units of the thermal and mechanical types. Let it be assumed further that the pointers 3 and 3a of the measuring units 2 and 2a are the pusher arms of the time lagged units rather than the conventional frictionally held pointers. If the measuring unit 2 is given a short interval, such as fifteen or thirty minutes, whereas the measuring unit 2a is given a long interval, such as twenty-four hours, the pointers 3 and 3a indicate, respectively, at any time the readings for the immediately preceding demand intervals. In other words, at any instant the pointer 3 provides the demand for the immediately preceding fifteen or thirty-minute interval whereas the pointer 3a provides the demand for the preceding one day interval. Consequently, the ratio of the readings of the pusher 3 and 3a may be taken at any time to provide a continuous record of load factor.

To facilitate reading operations, the shafts 5 and 5a may be coupled by a suitable calculating device 6 for arithmetically combining the rotations of the two shafts. The resultant obtained by the calculating device 6 may be indicated on a suitable scale 7 by a pointer 8. If desired, frictionally held pointers 8a and 8b may be positioned for actuation by the pointer 8 to show the maximum and minimum deflections of the pointer 8. The construction of maximum and minimum pointers is well known. In addition, a pen 9 of conventional construction may be provided for leaving a permanent record on a moving paper web or chart 10. From this brief description, it will be understood that the pointer 8 and the pen 9 at any instant indicate the load factor for the preceding short interval of fifteen or thirty minutes duration compared to the long interval of one day as represented by rotation of the shafts 5 and 5a. A suitable construction for the measuring units 2 and 2a and the calculating device 6 is shown in detail in Fig. 2.

Referring to Fig. 2, a pair of shafts 11 and 11a are shown which correspond to the shafts 5 and 5a of Fig. 1. Rotations of the shafts 11 and 11a are controlled, respectively, by measuring units 12 and 12a which correspond, respectively, to the measuring units 2 and 2a of Fig. 1. Rotations of the shafts 11 and 11a are arithmetically combined by a calculating device 13 which corresponds to the calculating device 6 of Fig. 1.

The measuring unit 12 includes a cam 14 which is fixed to the shaft 11 and which carries rotatably mounted thereon a planet gear 15. The planet gear 15 meshes with two sun gears 16 and 17 which are rotatably mounted on the shaft 11. It will be noted by inspection of Fig. 2 that the planet gear 15 and the sun gears 16 and 17 cooperate to form a differential gearing.

The sun gear 16 is driven from a constant speed source such as a synchronous motor 18 through a variable speed transmission having a driven drum 19 and a driving disk 20. Coupling of the disk 20 to the drum 19 is effected by means of a coupling ball 21 which rests on the drum 19 in engagement with the face of the disk 20. This ball 21 is urged against the cam 14 in any suitable manner as by proper inclination of the axis of the drum 19.

Rotation of the disk 20 from the motor 18 may be effected through suitable gearing such as a crown gear 22 carried by the disk 20, a pinion 23 which engages the crown gear 22, a gear 24 which is fixed with the pinion 23 to a common shaft 25, and a pinion 26 carried by the shaft of the motor 18.

For coupling the drum 19 to the sun gear 16, a worm gear 27 may be attached by means of a sleeve 28 to the sun gear 16 for rotation therewith. This worm gear 27 is driven by a worm 29 carried by a shaft 30 which is fixed to the drum 19. Consequently, the sun gear 16 is driven from the motor 18 at a rate of rotation which depends upon the position of the ball 21 relative to the disk 20. If the ball engages the center of the disk 20, no motion is imparted to the sun gear 16. However, if the ball engages the disk 20 adjacent the periphery of the disk, a substantial rate of motion is imparted to the sun gear 16 through the drum 19 and the gears 27 and 29.

The sun gear 17 is connected for rotation in accordance with a variable quantity to be measured. For example, a variable quantity may be measured by a suitable measuring instrument such as a kilovolt ampere-hour meter, an ampere-hour meter, or a watt-hour meter depending upon the particular quantity to be measured.

For purposes of illustration, it may be assumed that the sun gear 17 is driven from a watt-hour meter represented by a conventional watt-hour meter armature 31. To this end the sun gear 17 may be connected by means of a sleeve 32 to a gear 33 which meshes with an idler gear 34. The idler gear 34, in turn, meshes with a worm 35 which is carried by a shaft 36. A gear 37 on the shaft 36 meshes with a pinion 38 on the shaft of the watt-hour meter 31. By inspection of Fig. 2 it will be observed that the sun gear 17 rotates in accordance with rotation of the armature 31.

From the foregoing discussion it follows that the sun gear 17 rotates in accordance with watt-hours consumed by an electrical circuit associated with the watt-hour meter. If the sun gear 16 is not rotating at the same rate as the sun gear 17, the planet gear 15 and the cam 14 are actuated to move the ball 21 relative to the disk 20, until the sun gear 16 reaches the same rate of rotation as that of the sun gear 17. The rate at which the rotation of the sun gear 16 approaches the rate of rotation of the sun gear 17 depends upon the proportions of the various parts. As well understood in the art, the rate of deflection of the cam 14 is an exponential or logarithmical function with reference to time. By definition, the demand interval of a measuring unit such as unit 12 of Fig. 2 is taken as the time required for the cam 14 to reach 90% of its maximum deflection when the sun gear 17 changes from a rate of rotation equal to that of the sun gear 16 to a new and constant rate of rotation. A more complete description of the unit 12 may be found by reference to the aforesaid Smith Patent 2,003,016.

If the unit 12 is designed for a thirty-minute interval, then, at any instant, the position of the cam 14 and the position of the shaft 11 represent the demand for the immediately preceding thirty minute interval.

The measuring instrument 12a is similar to the measuring unit 12 and corresponding parts are designated by the same reference characters employed for the measuring unit 12 to which are added the identifying letter a. It will be observed that the gear 22a which is attached to the disk 20a of the unit 12a is driven from the gear 24 through a crown gear 39 which meshes with the gear 24 and which is carried by a shaft 40. A worm 41 attached to the shaft 40 engages the gear 22a for driving the disk 20a.

If desired, the sun gear 17a of the unit 12a may be driven from a separate measuring instrument, but for convenience, the sun gear 17a is illustrated as driven from the same watt-hour meter armature 31. For this purpose the gear 33a of the unit 12a is coupled to a gear 42 mounted on the sleeve 32. The gear 42 engages a crown gear 43 which is carried by a shaft 44. The shaft 44 also carries a worm 45 which engages the gear 33a for driving the sun gear 17a. The parts of the unit 12a are selected to provide a time lag substantially greater than that of the unit 12 such as twenty-four hours. Consequently, at any instant the position of the cam 14a and the position of the shaft 11a represent the demand for the twenty-four hour interval immediately preceding.

In order to combine arithmetically the rotations of the shafts 11 and 11a, the shaft 11 is coupled by suitable gearing 46 to a logarithmic gear 47 which engages a cooperating logarithmic gear 48. Similarly, the shaft 11a carries a logarithmic gear 49 which engages a cooperating logarithmic gear 50. The logarithmic gears 48 and 50 drive, respectively, the sun gears or wheels 51 and 52 of a differential gearing 53. For this purpose the sun gear 51 and the logarithmic gear 48 may be mounted on a common sleeve 54 which is rotatably mounted on a shaft 55. Similarly, the logarithmic gear 50 and the sun gear 52 may be mounted on a sleeve 56 which is rotatably carried by the shaft 55. The differential gearing 53 also includes a planet gear 57 which engages the sun gears 51 and 52 and which is rotatably mounted on a gear 58 which is carried by the shaft 55.

Because of the logarithmic gearing, the sun gear 52 rotates in accordance with a logarithmic function of the rotation of the shaft 11a, and the sun gear 51 rotates in accordance with a logarithmic function of rotation of the shaft 11. Depending upon the design of the gearing, the gear 58 is actuated in accordance with one-half the sum or difference of the rotations of the sun gears 52 and 51, or in accordance with one-half the sum or difference of the logarithmic functions of the rotations of the shafts 11 and 11a. From well known logarithmic relationships it follows that the resultant rotation of the gear 58 is in accordance with one-half the logarithm of the product or ratio of the rotations of the shafts 11 or 11a. In accordance with a preferred embodiment of the invention, the gearing is designed to provide a rotation of the gear 58 which is proportional to one-half the logarithm of the ratio of rotations of the shafts 11 and 11a.

From the foregoing discussion, it is apparent that the position of the gear 58 at any instant represents a function of the ratio of the rotations of the shafts 11 and 11a. Consequently, a scale associated with the gear 58 may be calibrated to read directly the desired ratio. If desired the movement of the gear 58 may be amplified by coupling thereto an additional gear 59. If the gear 59 has one-half the teeth provided in the gear 58, the rotation of the gear 59 is proportional directly to the logarithm of the ratio of the rotations of the shafts 11 and 11a; that is, the factor one-half is eliminated by the addition of the gear 59. Furthermore, if it is desired to eliminate the logarithmic scale required by the gear 59 or 58, an additional pair of logarithmic gears 60 and 61 may be provided. The gear 61 is connected to the gear 59 by means of a suitable shaft 62. The logarithmic gear 60 may carry a shaft 63 to which a pointer 64 is affixed for indicating on a suitable scale 65 the desired load factor.

At any instant the position of the pointer 64 on the scale 65 indicates the ratio of the load for the preceding thirty-minute interval, as measured by the unit 12, to the load for the preceding twenty-four hour interval, as measured by the unit 12a.

Although the invention has been described with reference to certain specific embodiments thereof, it is to be understood that the invention is susceptible to numerous modifications. Therefore, the invention is to be restricted only by the appended claims.

We claim as our invention:

1. In a measuring device for measuring a relationship between values of a variable quantity susceptible to variation with time, means for deriving from said variable quantity a first quantity corresponding to the value of said variable quantity for a first time value, means for deriving from said variable quantity a second quantity corresponding to the value of said variable quantity for a second time value, and translating means responsive to said first and second quantities in accordance with a predetermined function of said first and second quantities.

2. In a measuring device for measuring a relationship between values of a variable quantity susceptible to variation with time, means for deriving from said variable quantity a first quantity corresponding to the value of said variable quantity for a first time interval, means for deriving from said variable quantity a second quantity corresponding to the value of said variable quantity for a second time interval, and translating means responsive to said first and second quantities, said translating means including means for representing sensibly the ratio of said first quantity to said second quantity.

3. In a measuring device for measuring a relationship between values of a variable quantity susceptible to variation with time, measuring means responsive to the value of said variable quantity over a short time interval, measuring means responsive to the value of said variable quantity over a long time interval, said long time interval being substantially longer than said short time interval, and translating means for arithmetically combining the outputs of said measuring means to represent sensibly a function of a predetermined relationship between said outputs.

4. In a measuring device for measuring the load factor of an electrical circuit, first means responsive to the demand of said electrical circuit over a first time interval, second means responsive to the demand of said electrical circuit over a second time interval, said second time interval being substantially longer than said first time interval, and third translating means operated from said first and second means, said third means including means for representing sensibly a function of the ratio of said demands to each other.

5. In a measuring device responsive to a variable quantity, a pair of time lagged measuring units each responsive to said variable quantity, said measuring units having different time laggings, and translating means responsive to the outputs of said measuring units for determining the ratio of the outputs of said time lagged measuring units.

6. In a measuring device responsive to a variable quantity, a pair of time lagged measuring units each responsive to said variable quantity, said measuring units having different time laggings, and translating means responsive to the outputs of said measuring units for determining the ratio of the outputs of said time lagged measuring units, said means comprising means for deriving from each of said outputs a logarithmic quantity dependent on the value of the associated output, and means for arithmetically combining said logarithmic quantities to represent sensibly said ratio.

7. In a measuring device for measuring a variable quantity, a meter, a first movable element, means for moving said first movable element in accordance with operation of said meter for a first predetermined time interval, a second movable element, means for moving said second movable element in accordance with operation of said meter for a second predetermined time interval, and translating means responsive to the movements of said movable elements for arithmetically combining the movements of said movable elements to provide a resultant function of the movements of said movable elements.

8. In a measuring device for measuring a variable quantity, a meter, a first movable element, means continuously effective for moving said first movable element in accordance with operation of said meter for a first predetermined time interval prior to any instant, a second movable element, means continuously effective for moving said second movable element in accordance with operation of said meter for a second predetermined time interval prior to any instant, said predetermined times having substantially different values, and translating means responsive to the movements of said movable elements for arithmetically combining the movements of said movable elements to provide a resultant function of the movements of said movable elements.

9. In a measuring device for measuring a variable quantity, a meter, a first movable element, means continuously effective for moving said first movable element in accordance with operation of said meter for a first predetermined time interval prior to any instant, a second movable element, means continuously effective for moving said second movable element in accordance with operation of said meter for a second predetermined time interval prior to any instant, said predetermined times having substantially different values, and translating means responsive to the movements of said movable elements for arithmetically combining the movements of said movable elements to provide a resultant function of the movements of said movable elements, said last-named means comprising means for converting movements of said movable elements into their respective logarithmic values, and means for arithmetically combining said logarithmic values to provide a resultant function of the movements of said movable elements.

10. In a measuring device for measuring a relationship between values of a variable quantity susceptible to variation with time, means for deriving from said variable quantity a first quantity corresponding to the value of said variable quantity for a first time interval, means for deriving from said variable quantity a second quantity corresponding to the value of said variable quantity for a second time interval, and translating means responsive to said first and second quantities, said translating means including means for producing a resultant quantity dependent on a predetermined relationship between said quantities, said translating means comprising differential mechanism having sun wheels coupled respectively for energization in accordance with predetermined functions of said first and second quantities, said differential mechanism including a planet gear which is actuated from said sun wheels in accordance with a resultant function of said first and second quantities.

11. In a measuring device responsive to a variable quantity, a pair of time lagged measuring units each responsive to said variable quantity, said measuring units having different time laggings, and means for determining a function of the outputs of said time lagged measuring units, said means comprising differential mechanism having a pair of sun wheels and a planet gear operatively associated with said sun wheels, and means coupling said sun wheels for actuation respectively in accordance with predetermined functions of the outputs of said measuring units, whereby said planet gear is actuated in accordance with a resultant function of the outputs of said measuring units.

12. In a measuring device for measuring a variable quantity, a meter, a first movable element, means continuously effective for moving said first movable element in accordance with operation of said meter for a first predetermined time prior to any instant, a second movable element, means continuously effective for moving said second movable element in accordance with operation of said meter for a second predetermined time prior to any instant, said predetermined times having substantially different values, and means for arithmetically combining the movements of said movable elements to provide a resultant function of the movements of said movable elements, said last-named means comprising differential mechanism having a pair of sun wheels and a planet gear operatively associated with said sun wheels, logarithmic coupling means coupling each of said sun wheels to a separate one of said movable elements for actuation in accordance with a logarithmic function of the movement of the associated movable element, whereby said planet gear is actuated in accordance with the logarithm of a resultant function of the movements of said movable elements.

BENJAMIN H. SMITH.
WILLIAM M. BRADSHAW.